United States Patent
Chaudhry et al.

(10) Patent No.: US 9,621,405 B2
(45) Date of Patent: Apr. 11, 2017

(54) CONSTANT ACCESS GATEWAY AND DE-DUPLICATED DATA CACHE SERVER

(75) Inventors: Puneesh Chaudhry, Northbridge, MA (US); Sanjay Jain, Northborough, MA (US)

(73) Assignee: Good Technology Holdings Limited, Waterloo, Ontario (CA)

( * ) Notice: Subject to any disclaimer, the term of this patent is extended or adjusted under 35 U.S.C. 154(b) by 599 days.

(21) Appl. No.: 13/216,962

(22) Filed: Aug. 24, 2011

(65) Prior Publication Data

US 2012/0054296 A1    Mar. 1, 2012

Related U.S. Application Data

(60) Provisional application No. 61/376,433, filed on Aug. 24, 2010.

(51) Int. Cl.
*G06F 15/16* (2006.01)
*G06F 15/173* (2006.01)
(Continued)

(52) U.S. Cl.
CPC ........ *H04L 29/08729* (2013.01); *H04L 63/08* (2013.01); *H04L 63/10* (2013.01);
(Continued)

(58) Field of Classification Search
CPC ..... H04L 63/20; H04L 63/101; H04L 63/164; H04L 63/166; H04L 63/0272; H04L 63/0227; H04L 63/0209; H04L 63/0281; H04L 45/00; H04L 45/20; H04L 45/22; H04L 45/54; H04L 45/72; H04L 61/10; H04L 61/2514; H04L 61/2535;
(Continued)

(56) References Cited

U.S. PATENT DOCUMENTS 5,590,810 A    1/1997    Wehbi
5,754,765 A    5/1998    Danneels
(Continued)

FOREIGN PATENT DOCUMENTS

EP         0993165          4/2000
KR    10-2004-0091392 A    10/2004
(Continued)

OTHER PUBLICATIONS

International Search Report and Written Opinion of the International Searching Authority the Korean Intellectual Property Office for PCT/US2009/068687, mailing date of Aug. 3, 2010, 7 pages.
(Continued)

*Primary Examiner* — Farzana Huq
(74) *Attorney, Agent, or Firm* — Fish & Richardson P.C.

(57) ABSTRACT

An Constant Access Gateway provides secure access for remote mobile computing users to centrally stored data without requiring a VPN connection or a direct connection to the LAN in which the data resides. A Cache Server works alone or in conjunction with the Constant Access Gateway to provide distributed access to the centrally stored data. The Cache Server performs local storage of de-duplicated versions of the centrally stored data, and may interact with the Constant Access Gateway to maintain cache coherency with the central data store.

41 Claims, 3 Drawing Sheets

(51) Int. Cl.
*G06F 7/04* (2006.01)
*H04L 29/06* (2006.01)
*G06F 9/00* (2006.01)
*G06F 17/00* (2006.01)
*G06F 17/30* (2006.01)
*H04N 7/04* (2006.01)
*H04L 29/08* (2006.01)

(52) U.S. Cl.
CPC ........... *H04L 63/20* (2013.01); *H04L 67/04* (2013.01); *H04L 67/1095* (2013.01); *H04L 67/141* (2013.01); *H04L 69/14* (2013.01); *H04L 63/029* (2013.01); *H04L 63/0245* (2013.01); *H04L 63/0263* (2013.01); *H04L 63/0272* (2013.01); *H04L 67/146* (2013.01); *H04L 67/28* (2013.01)

(58) Field of Classification Search
CPC ..... H04L 12/66; H04L 12/96; H04L 12/2856; H04L 12/2598; H04L 12/4641; H04L 12/4675; H04L 12/5695
USPC ....... 709/213, 218, 227, 230–231, 238, 244, 709/246; 726/3, 12, 27
See application file for complete search history.

(56) References Cited

U.S. PATENT DOCUMENTS

| | | |
|---|---|---|
| 5,790,789 A | 8/1998 | Suarez |
| 5,826,014 A | 10/1998 | Coley |
| 5,826,024 A | 10/1998 | Higashimura |
| 5,832,514 A | 11/1998 | Norin |
| 5,850,517 A | 12/1998 | Verkler |
| 5,857,201 A | 1/1999 | Wright, Jr. |
| 5,873,104 A | 2/1999 | Tremblay et al. |
| 5,878,056 A | 3/1999 | Black |
| 5,895,471 A | 4/1999 | King |
| 5,987,463 A | 11/1999 | Draaijer |
| 5,990,810 A | 11/1999 | Williams |
| 6,065,046 A | 5/2000 | Feinberg et al. |
| 6,078,948 A | 6/2000 | Podgorny |
| 6,134,432 A | 10/2000 | Holmes |
| 6,185,598 B1 | 2/2001 | Farber |
| 6,196,846 B1 | 3/2001 | Berger |
| 6,226,649 B1 | 5/2001 | Bodamer |
| 6,289,382 B1 | 9/2001 | Bowman-Amuah |
| 6,351,771 B1 | 2/2002 | Craddock |
| 6,397,246 B1 | 5/2002 | Wolfe |
| 6,424,841 B1 | 7/2002 | Gustafsson |
| 6,463,463 B1 | 10/2002 | Godfrey |
| 6,473,794 B1 | 10/2002 | Guheen |
| 6,510,550 B1 | 1/2003 | Hightower |
| 6,526,493 B1 | 2/2003 | Ding |
| 6,563,800 B1 | 5/2003 | Salo |
| 6,704,730 B2 | 3/2004 | Moulton et al. |
| 6,742,081 B2 | 5/2004 | Talagala et al. |
| 6,782,419 B2 | 8/2004 | Tobita |
| 6,792,085 B1 | 9/2004 | Rigaldies |
| 6,802,068 B1 | 10/2004 | Guruprasad |
| 6,871,236 B2 * | 3/2005 | Fishman et al. ............... 709/246 |
| 6,877,023 B1 | 4/2005 | Maffeis |
| 6,922,725 B2 | 7/2005 | Lamming |
| 6,941,436 B2 | 9/2005 | Lee et al. |
| 6,947,761 B2 | 9/2005 | Hutcheson |
| 6,947,943 B2 | 9/2005 | DeAnna |
| 6,954,714 B2 | 10/2005 | Suzuki |
| 6,959,291 B1 | 10/2005 | Armstrong et al. |
| 6,959,436 B2 | 10/2005 | Peng |
| 6,976,146 B1 | 12/2005 | Aiello et al. |
| 6,981,029 B1 | 12/2005 | Menditto |
| 6,983,312 B1 | 1/2006 | O'Neil |
| 6,990,513 B2 | 1/2006 | Belfiore |
| 6,993,137 B2 | 1/2006 | Fransdonk |
| 7,010,581 B2 | 3/2006 | Brown |
| 7,020,697 B1 | 3/2006 | Mesoy |
| 7,020,783 B2 | 3/2006 | Vange |
| 7,028,049 B1 | 4/2006 | Shelton |
| 7,035,828 B2 | 4/2006 | Ketonen |
| 7,051,180 B2 | 5/2006 | Downer et al. |
| 7,065,619 B1 | 6/2006 | Zhu et al. |
| 7,085,834 B2 | 8/2006 | Delany |
| 7,130,885 B2 | 10/2006 | Chandra |
| 7,136,645 B2 | 11/2006 | Hanson |
| 7,269,173 B2 | 9/2007 | Iyer |
| 7,272,602 B2 | 9/2007 | Moulton |
| 7,305,532 B2 | 12/2007 | Zhu et al. |
| 7,356,494 B2 | 4/2008 | Ehrman |
| 7,363,349 B2 | 4/2008 | Friedman |
| 7,373,464 B2 | 5/2008 | Zhu et al. |
| 7,382,758 B2 * | 6/2008 | Silverman et al. ........... 370/338 |
| 7,460,857 B2 | 12/2008 | Roach |
| 7,472,242 B1 | 12/2008 | Deshmukh et al. |
| 7,477,166 B2 | 1/2009 | McCanne et al. |
| 7,504,969 B2 | 3/2009 | Patterson et al. |
| 7,562,147 B1 * | 7/2009 | Cohen .................... H04L 67/02 709/228 |
| 7,562,186 B2 | 7/2009 | Li et al. |
| 7,590,644 B2 | 9/2009 | Matsakis et al. |
| 7,624,335 B1 | 11/2009 | Maheshwari et al. |
| 7,631,084 B2 | 12/2009 | Thomas |
| 7,653,815 B2 | 1/2010 | Godfrey |
| 7,739,412 B2 | 6/2010 | Hall |
| 7,792,933 B2 | 9/2010 | Butts |
| 7,827,406 B2 | 11/2010 | Brown |
| 7,925,683 B2 | 4/2011 | Jain et al. |
| 7,958,245 B2 | 6/2011 | Thomas |
| 7,979,569 B2 | 7/2011 | Eisner et al. |
| 8,255,573 B2 * | 8/2012 | Kawamoto et al. .......... 709/249 |
| 8,261,057 B2 * | 9/2012 | Sundarrajan et al. ........ 713/151 |
| 8,798,084 B2 | 8/2014 | Pratt |
| 2002/0049841 A1 | 4/2002 | Johnson |
| 2002/0078198 A1 | 6/2002 | Buchbinder |
| 2002/0095487 A1 | 7/2002 | Day |
| 2002/0116472 A1 | 8/2002 | Kalish |
| 2002/0169972 A1 | 11/2002 | Tanaka et al. |
| 2003/0054810 A1 | 3/2003 | Chen |
| 2003/0115200 A1 | 6/2003 | Anthony |
| 2003/0131154 A1 | 7/2003 | Downer et al. |
| 2003/0177171 A1 | 9/2003 | Brown |
| 2003/0212873 A1 | 11/2003 | Lee et al. |
| 2003/0227892 A1 | 12/2003 | Cabana |
| 2004/0073835 A1 | 4/2004 | Kim |
| 2004/0082315 A1 | 4/2004 | Aoki |
| 2004/0139097 A1 | 7/2004 | Farber et al. |
| 2004/0172453 A1 | 9/2004 | De Mendonca |
| 2005/0050459 A1 | 3/2005 | Qu et al. |
| 2005/0060328 A1 * | 3/2005 | Suhonen ............. H04L 63/0263 |
| 2005/0216669 A1 | 9/2005 | Zhu et al. |
| 2006/0047855 A1 | 3/2006 | Gurevich et al. |
| 2006/0059171 A1 | 3/2006 | Borthakur et al. |
| 2006/0069719 A1 | 3/2006 | McCanne et al. |
| 2006/0069733 A1 | 3/2006 | Antonoff et al. |
| 2006/0109909 A1 | 5/2006 | Chang et al. |
| 2006/0120526 A1 | 6/2006 | Boucher et al. |
| 2006/0206669 A1 | 9/2006 | Zhu et al. |
| 2006/0212439 A1 | 9/2006 | Field |
| 2007/0028110 A1 | 2/2007 | Brennan |
| 2007/0061544 A1 | 3/2007 | Uppala |
| 2007/0136801 A1 * | 6/2007 | Le .................... H04L 63/102 726/10 |
| 2007/0143359 A1 | 6/2007 | Uppala |
| 2007/0239945 A1 | 10/2007 | Li et al. |
| 2007/0239946 A1 | 10/2007 | Zhu |
| 2007/0244966 A1 | 10/2007 | Stoyanov et al. |
| 2008/0013830 A1 | 1/2008 | Patterson et al. |
| 2008/0043760 A1 | 2/2008 | Venkatraman et al. |
| 2008/0050025 A1 | 2/2008 | Bashyam et al. |
| 2008/0050026 A1 | 2/2008 | Bashyam et al. |
| 2008/0050027 A1 | 2/2008 | Bashyam et al. |
| 2008/0050029 A1 | 2/2008 | Bashyam et al. |
| 2008/0050047 A1 | 2/2008 | Bashyam et al. |
| 2008/0052769 A1 | 2/2008 | Leone et al. |

(56) References Cited

U.S. PATENT DOCUMENTS

| | | | |
|---|---|---|---|
| 2008/0075097 A1* | 3/2008 | Kitada | H04L 29/12367 370/401 |
| 2008/0082525 A1 | 4/2008 | Cha et al. | |
| 2008/0133835 A1 | 6/2008 | Zhu et al. | |
| 2008/0159331 A1 | 7/2008 | Mace et al. | |
| 2008/0177997 A1* | 7/2008 | Morais | H04L 29/12009 713/153 |
| 2008/0183767 A1 | 7/2008 | Zhu et al. | |
| 2008/0256143 A1 | 10/2008 | Reddy et al. | |
| 2008/0263215 A1* | 10/2008 | Schnellbaecher | H04L 63/0281 709/229 |
| 2008/0270729 A1 | 10/2008 | Reddy et al. | |
| 2008/0281908 A1 | 11/2008 | McCanne et al. | |
| 2008/0294660 A1 | 11/2008 | Patterson et al. | |
| 2008/0320106 A1 | 12/2008 | McCanne et al. | |
| 2008/0320151 A1 | 12/2008 | McCanne et al. | |
| 2009/0063528 A1 | 3/2009 | Yueh | |
| 2009/0063795 A1 | 3/2009 | Yueh | |
| 2009/0079597 A1 | 3/2009 | McCanne et al. | |
| 2009/0083563 A1 | 3/2009 | Murase | |
| 2009/0216774 A1 | 8/2009 | Rao et al. | |
| 2009/0216788 A1 | 8/2009 | Rao et al. | |
| 2009/0240718 A1 | 9/2009 | Rao et al. | |
| 2009/0265397 A1 | 10/2009 | Williams | |
| 2009/0287725 A1 | 11/2009 | von Praun | |
| 2009/0289819 A1 | 11/2009 | Mahoney | |
| 2010/0011007 A1* | 1/2010 | Bettger et al. | 707/10 |
| 2010/0027552 A1* | 2/2010 | Hill | 370/401 |
| 2010/0070634 A1* | 3/2010 | Ranjan | H04L 63/0869 709/228 |
| 2010/0131659 A1 | 5/2010 | Narayana et al. | |
| 2010/0161608 A1 | 6/2010 | Jain et al. | |
| 2010/0161685 A1 | 6/2010 | Jain et al. | |
| 2011/0225141 A1 | 9/2011 | Chaudhry et al. | |
| 2011/0231374 A1 | 9/2011 | Jain et al. | |
| 2013/0067098 A1* | 3/2013 | Litovski et al. | 709/227 |

FOREIGN PATENT DOCUMENTS

| | | |
|---|---|---|
| WO | 9746939 | 12/1997 |
| WO | 0177815 | 10/2001 |
| WO | 0193033 | 12/2001 |
| WO | 0206964 | 1/2002 |
| WO | 02065280 | 8/2002 |
| WO | WO-2009/087028 A1 | 7/2009 |
| WO | WO-2010/080591 | 7/2010 |
| WO | WO-2011/113042 | 9/2011 |
| WO | WO-2011/116087 | 9/2011 |
| WO | WO-2012/027472 A2 | 3/2012 |

OTHER PUBLICATIONS

International Search Report and Written Opinion of the International Searching Authority, the Korean Intellectual Property Office, for International Application No. PCT/US2011/028318, date of mailing Sep. 27, 2011, 7 pages.

International Search Report and Written Opinion of the International Searching Authority, the Korean Intellectual Property Office, for International Application No. PCT/US2011/028656, dated Oct. 26, 2011, 6 pages.

Vipin Samar. "Single Sign-On Using Cookies for Web Applications", IEEE, 1999, pp. 158-163.

George Apostolopoulos, et al., "Design, Implementation and Performance of a Content-Based Switch", IEEE INFOCOM 2000, pp. 1117-1126.

Steffen Lipperts, Anthony Sang-Bum Park, An Agent-Based Middleware—A Solution for Terminal and User Mobility, 1999, Computer Networks.

John Lamb, Peter Lew, Lotus Notes and Domino 5—Scalable Network Design—Web Server Network Infrastructure, 1999, McGraw-Hili.

A. Freier, P. Karlton, and P. Kocher, The SSL 3.0 Protocol, Nov. 18, 1996, Netscape Communicatios Corp.

"Java Message Service", Sun Microsystems Corp., Mountain View, CA, Nov. 9, 1999.

Mark R. Brown, Using Netscape™ 2, Special Edition, The Most Complete Reference (Chapter 33): 1995: 25 Pgs. (RIMV00055304-RIMVOO055328).

Microsoft Exchange 2000 Server, Customizing Microsoft® Outlook® Web Access White Paper: Published Nov. 2001: 106 Pgs. (RIMVOO055329-RIMVOO055434).

Microsoft Exchange 2000 Server, Microsoft® Outlook Web Access in Microsoft Exchange 2000 Server: Published Mar. 2000 (Updated May 2002: 18 Pgs. (RIMVOO055435-RIMVOO055452).

KC Lemson, et al.: Using Microsoft® Exchange 2000, Front End Servers: Published Jun. 2000 (Updated Oct. 2002: 95 Pgs. (R IMV00055453-R I MV00055541 ).

Klensin, J., et al., Simple Mail Transfer Protocol, Apr. 2001. AT&T Laboratories, pp. 1-79.

Crispin, M., Internet Message Access Protcol—Version 4, Sep. 2002, University of Washington, pp. 1-97.

Meyers, J., Post Office Protocol—Version 3, May 1996, Dover Beach Consulting, Inc., pp. 1-23.

GLOMOP Group: "GloMop: Global Mobile Computing by Proxy" GloMop, Sep. 13, 1995.

Extended European Search Report issued in European Application No. 11820595.4 on Oct. 26, 2016.

* cited by examiner

CONSTANT ACCESS GATEWAY AND DE-DUPLICATED DATA CACHE SERVER

CROSS-REFERENCE TO RELATED APPLICATIONS

This application claims the benefit under 35 U.S.C. §119 (e) to U.S. Provisional Application No. 61/376,433, entitled Constant Access Gateway and De-Duplicated Data Cache Server, filed on Aug. 24, 2010.

FIELD OF THE DISCLOSURE

This disclosure relates to providing data access, and specifically for providing secure and efficient access to centrally-stored data.

BACKGROUND

Traditional data storage systems are designed to be centrally stored, managed and searched. Examples of such systems include backup servers, file servers, document repositories like SharePoint, Documentum etc. These systems typically reside in a corporate data center, behind a firewall, and are available only to those users who are connected to the corporate network, either via a LAN (local area network), or via a VPN (virtual private network) usually over a WAN (wide area network) such as the Internet.

There are several considerations that make it harder to maintain data centrally, including (1) the proliferation of remote sites, (2) the presence of mobile users, and (3) the proliferation of smart phones and other mobile devices. First, there are many remote sites in a company from which there is a need to access data that may be stored centrally. These sites may be connected to the central site either via a dedicated WAN connection or via a VPN over the Internet. However, given the latency of WAN connections, it may be difficult or slow to access data over the WAN from the central site. Second, there may be mobile and remote users in a corporation, who, while connected to the Internet, are not necessarily connected to the central site via a VPN connection. Third, many of these remote users may utilize mobile devices such as smart phones and tablets that may not have the ability to connect via a VPN, or for whom such connections are intermittent.

SUMMARY

The methods and systems described here can be used to provide secure, reliable, efficient, and ubiquitous access to centrally-stored data behind one or more firewalls, e.g., in a corporate data center from devices which are not directly connected to the corporate network via VPN or LAN.

Some embodiments described herein have two main components: a Constant Access Gateway and a De-duplicated Data Cache Server.

Constant Access Gateway

The Constant Access Gateway (CAG) can provide the following benefits:
1. Ubiquitous, secure access to corporate data without requiring a VPN connection or opening any incoming firewall ports
2. Multi-level and multi-factor authentication with existing authentication mechanisms
3. Built-in encryption
4. A scalable system supporting multiple simultaneous connections
5. Configurable access to logical data flow direction, supporting either just inflow or outflow or both
6. Configurable access based on user, location or other identifiable metadata.

De-Duplicated Data Cache Server

The De-duplicated Data Cache Server (hereinafter, "the Cache Server") includes a de-duplicated repository of data stored in the form of unique objects or blocks of data. The data is a cache that is intelligently built and managed based on the access needs of the site which is served by the Cache Server. Some of the features of the Cache Server are:
1. Distributed cache: the Cache Server may be distributed across one or more remote sites, in addition to the central site, enabling faster and more reliable access to data.
2. De-duplicated data: All data is stored in a de-duplicated form, ensuring that only unique objects or blocks are stored at each site. This makes data storage more efficient, and increases the amount of useful data that can be stored at each site of the Cache Server.
3. WAN efficiency: Only unique blocks or objects are transferred to the Cache Server.
4. Intelligent handling of cache misses: The system keeps a map of various potential sources of data. In the event that data is requested that is not in the cache (a "cache miss"), the Cache Server can intelligently retrieve the missing data from the best available source based on cost, latency, and/or other factors.
5. Pre-population of data blocks: the system supports pushing out blocks of data before they are needed in order to expedite an anticipated future access at a remote site.
6. Flushing of data blocks: the system supports flushing out data from a remote cache server based custom security policies, the age of the data blocks in the cache, and/or other factors.

BRIEF DESCRIPTION OF THE DRAWINGS

For a more complete understanding of disclosure, reference is now made to the following descriptions taken in conjunction with the accompanying drawings in which.

DETAILED DESCRIPTION

Constant Access Gateway

Figure 1:
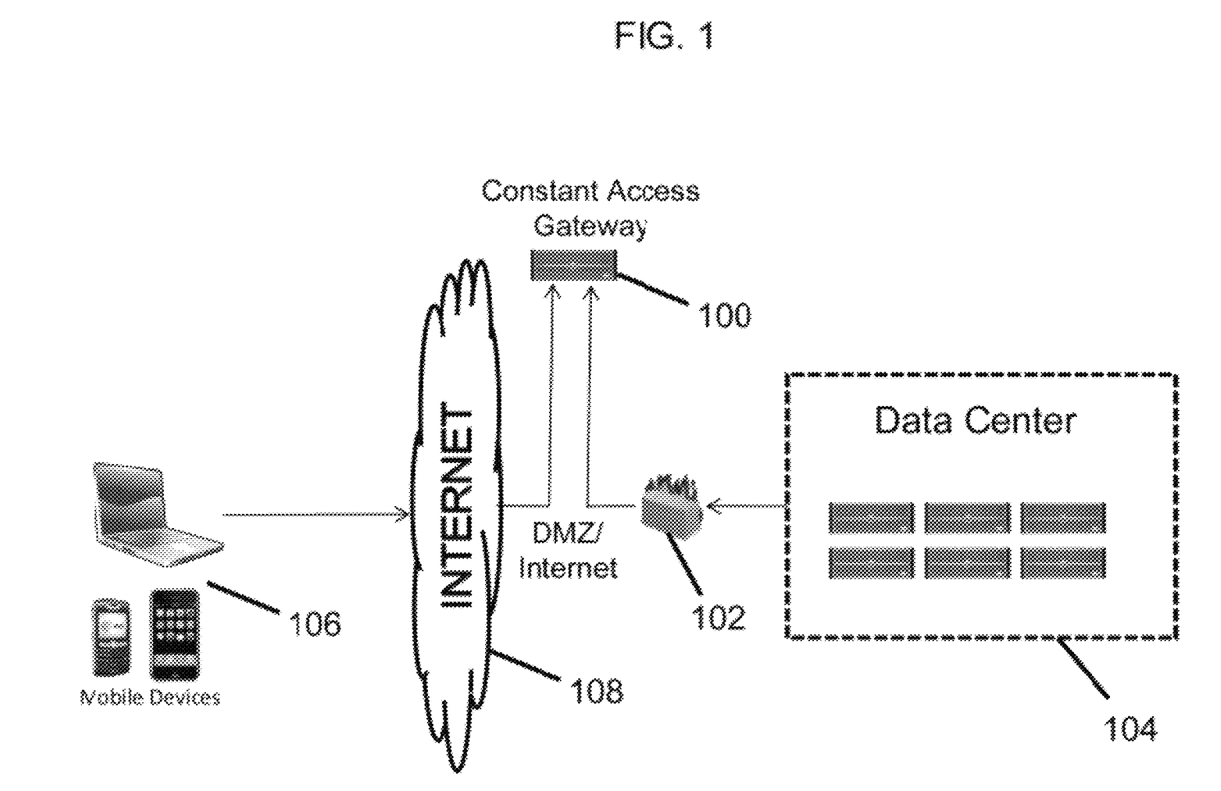
FIG. 1 is a network diagram that shows a sample deployment of a constant access gateway in accordance with certain embodiments.

As shown in FIG. 1, Constant Access Gateway (CAG) 100 enables secure, authenticated and policy-based transmission of data to and from a data store 104 behind a firewall 102. The CAG may be software- and/or hardware-based, and has access to one or more processors and memory operable to implement the capabilities described in this disclosure. CAG 100 may be placed in the DMZ (demilitarized zone) between firewall 102 and the Internet 108. Alternatively it may be placed anywhere on the Internet where it is reachable via a public IP address.

Connection Process

Mobile or remote devices 106 are connected to the Internet 108. These may include portable digital assistants (PDAs), laptop computers, cellular telephones, tablets, servers at remote sites and other computing devices. The mobile or remote devices are outside firewall 102, and hence cannot directly access the data store 104 without opening incoming ports on the firewall 102, which would pose a security risk. Instead, CAG 100 acts as a broker between mobile devices 106 and data store 104. CAG 100 has a private interface to data store 104, and also has an interface to the Internet 108. This setup allows the CAG to create a "virtual connection" between a mobile device and data store 104 as follows:

1. The data store 104 establishes an outbound connection with CAG 100 that is initiated from behind the firewall. This connection is called the control channel and is used for message transmission between the CAG 100 and the data store 104. Some or all of the communication between CAG 100 and data store 104 is encrypted via an initial secure key exchange.
2. CAG 100 authenticates the data store 104 connection to validate that the data store 104 is authorized to connect to CAG 100. This authentication may be performed using a pre-assigned token, a certificate, a username/password combination or another authentication mechanism.
3. The mobile or remote device initiates a connection to CAG 100, requesting a connection to data store 104. The mobile device may connect using either a standard internet browser or other software that is specifically configured to enable this connection.
4. CAG 100 authenticates the request to verify the sender's identity, and determines whether the requested connection is authorized. Authentication/authorization is described in more detail below.
5. If the connection request is authorized, CAG 100 first adds the connection request to an internal queue, assigning it a unique identifier. The CAG then forwards a connection request to data store 104 on the secure control channel, identifying the request using at least the assigned unique identifier.
6. Data store 104, upon receiving a request on the control channel, first authorizes and authenticates the request based on a variety of factors:
   a. Is the device requesting a connection authorized to connect over the CAG
   b. Has the device requesting a connection provided the necessary authentication information, for example: user name/password, device access token or other similar authentication mechanisms.
7. Data store 104, upon authentication, determines the resources available for the mobile or remote device requesting the connection, publishes only those resources to the device and then initiates an outbound connection request to CAG 100, identifying the request with the unique identifier.
8. CAG 100, upon receiving the outbound connection request from the data store, finds a match in its internal queue of pending connections using the unique identifier. Upon finding the match, CAG 100 "joins" the connection between the CAG and the mobile device together with the connection between the CAG and the data store. Gateway 100 then informs mobile device 106 that a virtual connection to data store 104 is available.
9. Once the virtual connection has been established, CAG 100 routes all data from the mobile device to data store 104, and routes all data from the data store to the mobile device. Thus, the mobile device and the data store can communicate with each other as if they were directly connected via a socket connection.

Figure 3:
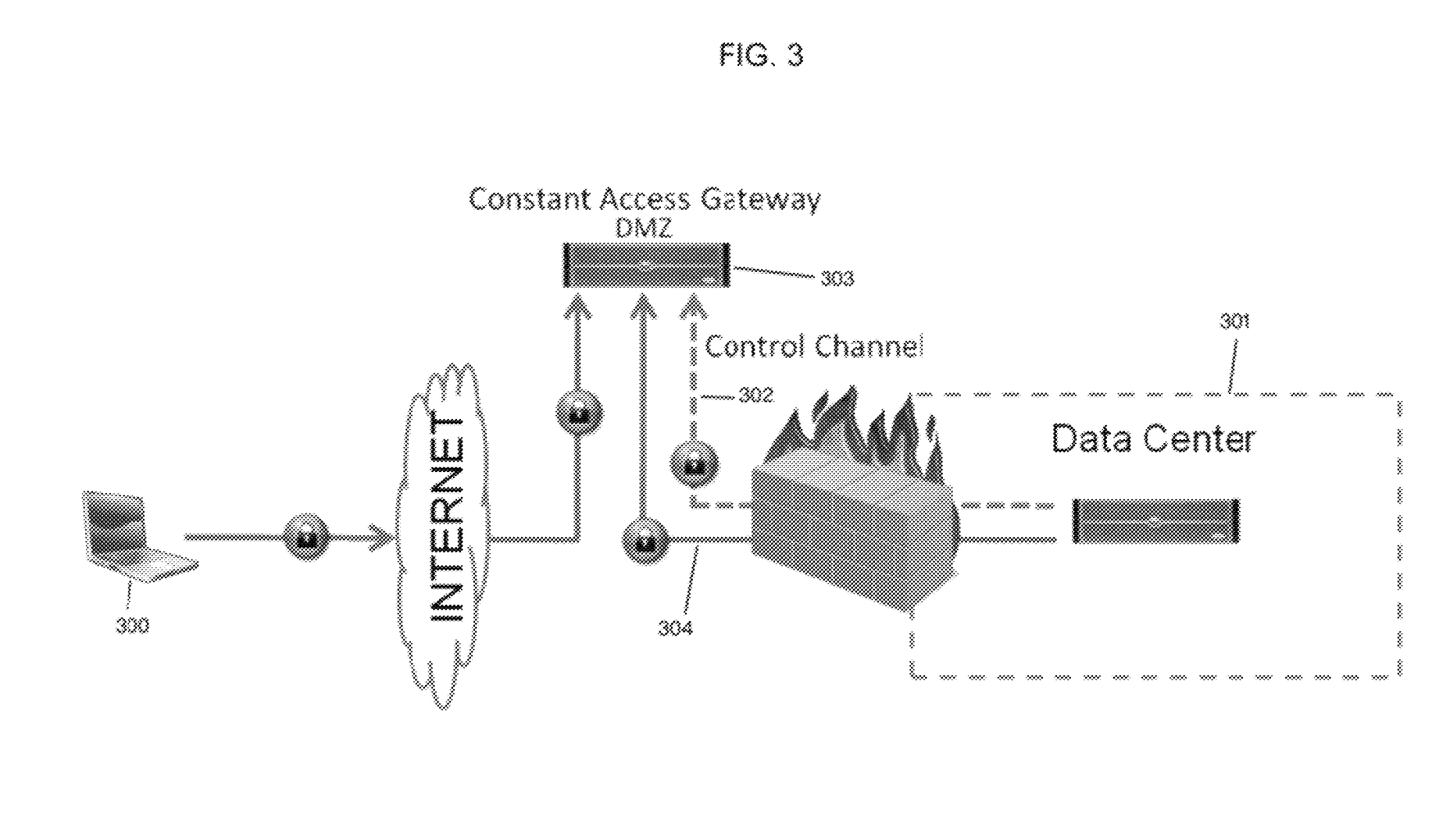
FIG. 3 is a flow diagram that shows a sample deployment of a constant access gateway in accordance with certain embodiments.

FIG. 3 shows the process by which a virtual connection is established between Mobile Device 300 and Data Center 301. First, the Data Center establishes an outbound connection 302 to CAG 303, using the connection parameters specified as part of the configuration. This establishes a secure Control Channel between Data Center 301 and CAG 303. Then, when Mobile Device 300 connects to CAG 303, the CAG communicates with Data Center 301 via the secure Control Channel already established. If the user of Mobile Device 300 is an authorized user and is permitted by the policy settings to be able to connect remotely via the CAG, the connection is accepted. Otherwise, the connection is rejected. If the user of Mobile Device 300 is an authorized user, Data Center 301 establishes a dedicated connection 304 to CAG 303 for that user, effectively establishing a secure channel between Mobile Device 300 and Data Center 301.

Authentication and Authorization

When a mobile device initiates a connection, Constant Access Gateway 100 performs authentication and authorization operations. Initially, while the mobile device is connected to the corporate network via a LAN or a VPN, the mobile device is given a secure token. The mobile device includes this secure token when making a connection request to CAG 100 to "prove" the mobile device's identity.

CAG 100 validates the token with a token authority to ensure that it is still valid. A variety of token management schemes may be used to determine when secure tokens become invalid. For example, secure tokens may automatically expire after a specified amount of time. A secure token may also be explicitly invalidated by the system for a variety of reasons. Token management may be handled by the CAG 100, or by an entity behind the firewall 102 (e.g. data store 104 or some other server).

After it has been determined that the token included in the device is valid, CAG 100 determines whether the mobile device is authorized to access the requested data service.

Configurable Direction of Logical Data Flow

Constant Access Gateway 100 allows granular configuration of logical data flow between data store 104 and mobile devices 106. For example, global, per-device, and per-user security policies may be configured to allow any of the following modes of data transmission:

1. Logical data inflow only: In this option, CAG 100 does not permit any outbound flow of data from the data store. For example, while CAG 100 might allow mobile devices 106 to store data on the data store 104, it may not allow them to retrieve data from the data store. This mode may be used to minimize the outflow of sensitive data across the internet, while still allowing data stored locally on mobile devices to be transferred to the data store for backup.

2. Logical data outflow only: In this mode, CAG 100 does not permit any logical inbound flow of data to data store 104, but permits retrieval of data for devices connecting via CAG 100. This mode may be used to prevent mobile devices from tampering with the data in the data store and is useful for cases like publishing.
3. Logical data inflow and outflow: In this mode, CAG 100 permits both logical inflow and outflow of data to the data store 104.

Configurable Access Based on Data Type, User Profile, Location, and Other Factors CAG 100 supports limiting access to data (e.g. preventing data access entirely, or imposing limits on logical data flow such as those described above) on a per-user and/or a per-device basis. Data access may be based on one or more of the following properties of the mobile device and its user:
1. Device profile
2. User profile
3. Location of user
4. Days since disconnected from the corporate network
5. Data store location
6. Data type
7. Data classification
8. Data content These properties may comprise configurable parameters, data types and other intrinsic properties of the data to be transmitted, and metadata, environmental and otherwise, which may be used to block or otherwise restrict access across the virtual communication channel between the mobile device and the data store.

This configurability of CAG 100 provides organizations full control over data access and flow based on a variety of traits of the accessing user, device and the data being accessed.

The systems and methods described here allow access without requiring VPN or LAN access. Providing secure access to corporate data stores behind one or more firewalls without requiring a VPN is a challenge for most organizations. For example, mobile users can have devices containing data that has been created while the users are disconnected from the corporate network. The mobile user copy might be the only copy of the data that has been created, so the data needs to be backed up. However, lack of a consistent VPN connection can results in backups happening infrequently. In another example, end users may want to access their corporate data using their mobile devices even when they are not connected via VPN. Accessing this corporate data—which may be behind a corporate firewall—can be challenging. This issue can lead users to resort to methods for accessing data that might not be approved by the corporation (or other data manager or owner). Such users may synchronize data to public cloud-based solutions to allow them to access their data from anywhere. This approach can be a security concern for corporations, as their confidential data exists on computing assets not owned by the corporation, and may even present concerns about corporate compliance with regulatory requirements.

Providing reliable and high performance access to centrally stored data can also be a problem. Because of network latency issues, companies may resort to storing data in multiple sites. This can cause several issues:
1. Cost: maintaining infrastructure in multiple sites can lead to increased costs. The data in remote sites has to be backed up. This can lead to increased storage and administration costs. Part of this cost is due to maintaining data storage facilities in the multiple sites that are capable of mirroring a sufficiently large portion of the central data to provide efficient localized access to that data.
2. Security: an additional cost is the cost of ensuring that the data stored in remote sites is secure.
3. Complexity: maintaining infrastructure in multiple sites can lead to increased complexity.
4. Reduced control: since the data is no longer stored in a central site, this can lead to reduced control.

De-Duplicated Data Cache Server

Figure 2:
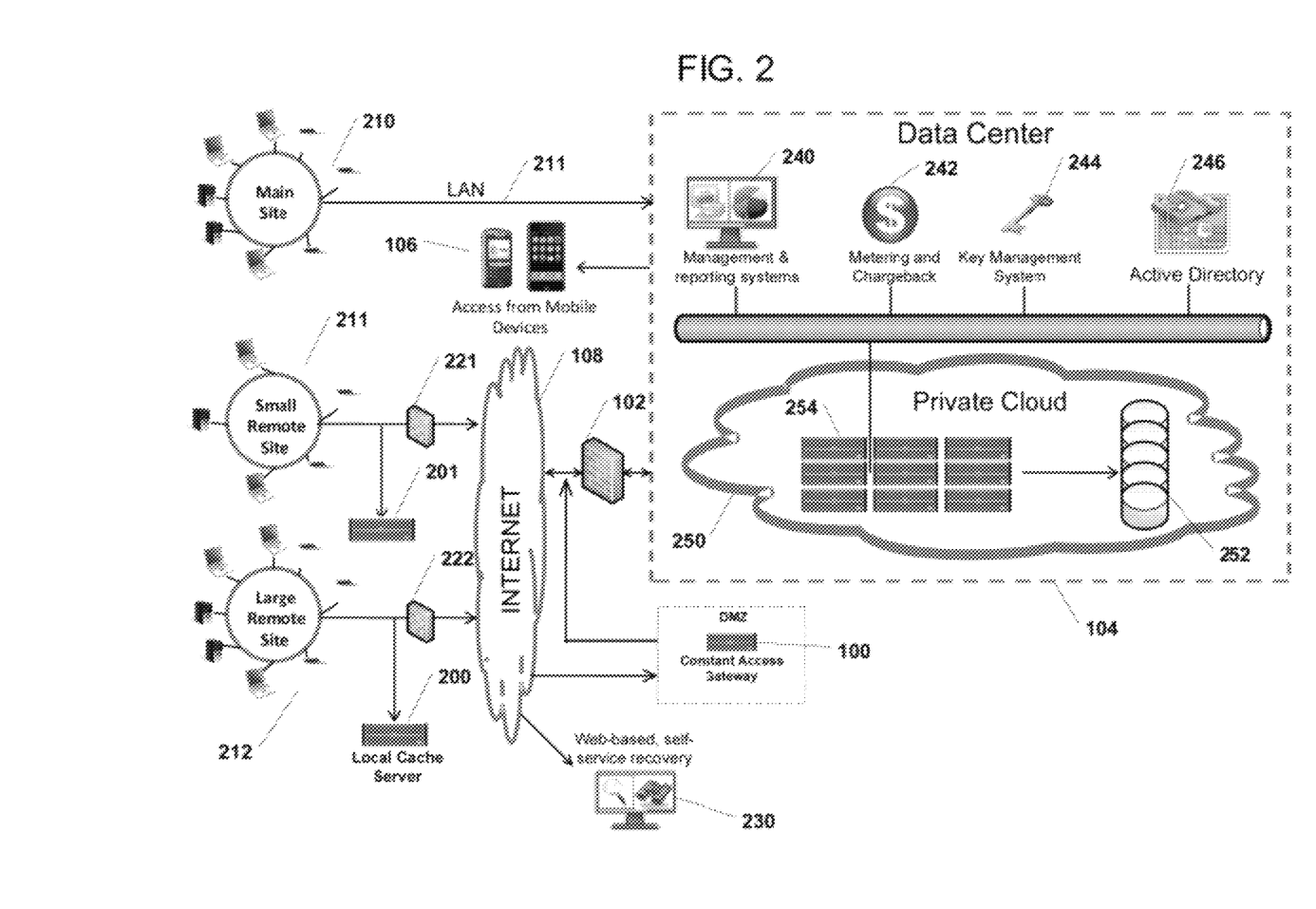
FIG. 2 is a network diagram that shows a sample deployment of a constant access gateway and a de-duplicated data cache server in accordance with certain embodiments.

As shown in FIG. 2, a cache server with de-duplicated data enables secure, efficient, distributed, and disconnected access to corporate data that is stored centrally. Cache Server 200 contains a de-duplicated repository of data stored in the form of unique objects or blocks of data. Cache Server 200 also has one or more processors and memory configured to implement the capabilities described herein. Storage and management of the data on Cache Server 200 may be accomplished, for example, by a system such as that described in US Patent Publication Nos. US-2010-0161608 and US-2010-0161685, both of which are incorporated by reference herein in their entirety.

Cache Server 200 may, for example, be deployed behind a firewall 222 to provide efficient access to users in a remote site 212 in order to back up data stored on the remote site to data store 104. Another Cache Server 201 may be placed behind firewall 221 to provide read-only access to users within site 211 to de-duplicated copies of data stored centrally in data store 104 without introducing the additional network latency that would otherwise be involved in site 211 accessing that data through the internet. Users at main site 210 may, of course, access data store 104 directly through LAN 211, including users with mobile devices 106 who have LAN access directly to data store 104. Mobile devices 106 without direct LAN access to data store 104 may also access the data store through the Internet 108 using the Constant Access Gateway 100 as discussed above. Access to Cache Servers 200 or 201, or to data store 104 through Gateway 100 may also be obtained through a web-based self-service recovery system 230.

Data store 104 can include management and reporting systems 240, metering and chargeback systems 242, a key management system 244, and one or more active directory systems 246. Key management system 244 can create and manage tokens for users of Constant Access Gateway 100. Storage within data store 104 may be accomplished using a private cloud 254 within which one or more servers 254 provide access to de-duplicated object repositories and associated catalogs 252.

One or more servers 254 are responsible for maintaining a catalog, of de-duplicated objects. Without de-duplication, multiple copies of these objects would be stored in various places throughout the data store. In a de-duplicated data store, each of these objects is stored in the catalog only once and indexed according to a unique identifier. Other locations in the data store may include a reference to a de-duplicated object using that object's unique identifier. Servers 254 are also responsible for reconstructing and providing access to the original files (which may be reconstructed using the de-duplicated objects), including providing the files to an active directory service 246.

The data in the Cache Server 200 is intelligently built and managed based on the local access needs of users or devices dependent on that instance of the Cache Server. There can be multiple Cache Servers in an overall system. Some of the features of the Cache Server 200 are:

1. Distributed service: A Cache Server can be running on a device that can service requests from just that device or that can service multiple devices, e.g. one or more sites.
2. Data retrieval and storage using Cache Server: All data storage and retrieval requests for devices configured to use Cache Server 200 have the option of to first service their request using the Cache Server instead of the central data store. This enables faster access and storage of data. Cache Server 200 can work in conjunction with Gateway 100 by having the Cache Server connect to a data store through the Gateway in the same manner as a mobile device.
3. De-duplicated: Data on the Cache Server is stored in a de-duplicated form (i.e., only unique objects or blocks in the data are stored, ensuring significant storage savings).
4. Automatic synchronization with central data store: The Cache Server ensures that new data it receives from the devices it is servicing is "synchronized" with the central data store. This synchronization can be synchronous or asynchronous. This synchronization may include the backup of local data to the central data store.
5. De-duplicated transfer of data over the WAN: The Cache Server only transmits or receives unique objects or blocks to the devices it is servicing and to the central data store. In other embodiments, the Cache Server may reconstruct files or other data objects from the unique objects or blocks prior to passing the files/objects to the serviced device.
6. Intelligent handling of cache miss: The Cache Server keeps a map of various potential sources of objects and blocks along with a measure of the cost of retrieval from those potential sources. In the case of a cache miss, the Cache Server can intelligently retrieve the missing block from the best available source based metrics such as cost or latency.
7. Pre-population of objects or blocks: The Cache Server can "pull-down" required blocks to service an anticipated future access by devices it services. Such a pull-down can be manual or automated based on policy settings.
8. Deletion of Cache Data: Cache Server 200 can delete objects or blocks from its cache or restrict access to them based on policies that define acceptable thresholds for multiple factors. These factors include:
   Age of data
   Number of days since a secure VPN or LAN connection was established with the corporate network
   Access profiles (e.g. if a lot of data is suddenly being accessed in an unusual manner
   Data type: sensitive data as defined by an organization's document classification properties It will be appreciated that the scope of the present inventions is not limited to the above-described embodiments, but rather is defined by the appended claims, and that these claims will encompass modifications of and improvements to what has been described. For example, different types of processors and memory may be used to implement the Constant Access Gateway. There are many references to maintaining data in storage; this storage may be any suitable form of memory, such as digital disks, optical disks, or semiconductor memory. The processing acts that are described may be performed using any suitable hardware and/or software logic or combination thereof, and implemented using any suitable processor, such as a general-purpose processor or an application-specific processor. Many of the acts described above may be performed by software stored in computer-readable memory as instructions that, when executed, perform the described steps (e.g., establishing a connection, authentication, authorization, etc.).

What is claimed is:

1. A method for initiating secure communication between a data store and a client device via a gateway, the method comprising:
   receiving, from the data store, a request to establish a control channel between the data store and the gateway;
   receiving, at the gateway, from the client device, a first connection initiation request to establish a first connection between the client device and the gateway, the first connection initiation request including a connection request to the data store;
   forwarding the connection request included in the first connection initiation request, from the gateway to the data store, via the control channel in response to receiving the first connection initiation request from the client device;
   receiving, at the gateway, from the data store, a second connection initiation request to establish a second connection between the gateway and the data store;
   receiving authentication information corresponding to the client device from the gateway at the data store via the control channel;
   authenticating the client device on the basis of the received authentication information, and thereafter selectively establishing the second connection in dependence on the authentication;
   joining, at the gateway, the first connection between the client device and the gateway and the second connection between the gateway and the data store;
   determining, at the gateway, data flow mode for the client device based on a security policy associated with the client device, the data flow modes comprising an inflow only mode, an outflow only mode, and an inflow and outflow mode, wherein the inflow only mode permits inbound flow of data to the data store but does not permit outbound flow of data from the data store, wherein the outflow only mode permits outbound flow of data from the data store but does not permit inbound flow of data to the data store, and wherein the inflow and outflow mode permits inbound flow of data to the data store and outbound flow of data from the data store;
   in response to receiving inbound data from the client device via the first connection at the gateway:
      when the data flow mode is determined to be one of the inflow only mode or the inflow and outflow mode, transmitting, from the gateway, the received inbound data to the data store via the second connection; and
      when the data flow mode is determined to be the outflow only mode, refusing to transmit, from the gateway, the received inbound data to the data store via the second connection;
   in response to receiving outbound data from the data store via the second connection at the gateway:
      when the data flow mode is determined to be one of the outflow only mode or the inflow and outflow mode, transmitting, from the gateway, the received outbound data to the client device via the first connection; and when the data flow mode is determined to be the inflow only mode, refusing to transmit, from the gateway, the received outbound data to the client device via the first connection.

2. The method of claim 1, further comprising:
receiving authentication information at the gateway from the data store;
authenticating the data store on the basis of the received authentication information; and thereafter
selectively establishing the control channel in dependence on the authentication.

3. The method of claim 1, wherein the connection request from the gateway to the data store includes a unique identifier assigned to the first connection.

4. The method of claim 1, further comprising:
determining at the data store which resources and associated actions are available to the client device; and
publishing the available resources and associated actions to the client device.

5. The method of claim 1, further comprising: using a unique identifier assigned to the first connection to create the second connection.

6. The method of claim 1, wherein the inbound data and the outbound data are encrypted.

7. The method of claim 1, further comprising:
receiving authentication information at the gateway from the client device;
authenticating the client device on the basis of the received authentication information; and
selectively establishing the first connection in dependence on the authentication.

8. The method of claim 7, wherein the received authentication information comprises a secure token.

9. The method of claim 1, wherein the security policy is based on at least one property of the client device.

10. The method of claim 9, wherein the at least one property comprises one of a device profile of the client device, a user profile associated with the client device, or a location of the client device.

11. The method of claim 1, wherein the security policy is based on a property associated with the outbound data.

12. The method of claim 1, wherein the security policy is based on a property associated with the inbound data.

13. The method of claim 1, wherein the security policy is based on metadata associated with the outbound data.

14. The method of claim 1, wherein the security policy is based on metadata associated with the inbound data.

15. A system for providing secure communication between a data store and a client device via a gateway, the system comprising:
the data store configured to:
store data in a computer-readable form;
initiate a control channel with the gateway; and
initiate a second connection with the gateway in response to receiving a connection request from the gateway at the data store;
the gateway configured to:
receive, at the gateway, from the client device, a first connection initiation request to establish a first connection between the client device and the gateway, the first connection initiation request including a connection request to the data store;
forward the connection request included in the first connection initiation request to the data store via the control channel in response to receiving, over the first connection, the first connection initiation request from the client device;
receive authentication information from the data store; and
authenticate the data store on the basis of the received authentication information;
establish the second connection to the data store;
determine data flow mode for the client device based on a security policy associated with the client device, the data flow modes comprising an inflow only mode, an outflow only mode, and an inflow and outflow mode, wherein the inflow only mode permits inbound flow of data to the data store but does not permit outbound flow of data from the data store, wherein the outflow only mode permits outbound flow of data from the data store but does not permit inbound flow of data to the data store, and wherein the inflow and outflow mode permits inbound flow of data to the data store and outbound flow of data from the data store;
in response to receiving inbound data from the client device via the first connection:
when the data flow mode is determined to be one of the inflow only mode or the inflow and outflow mode, transmit the received inbound data to the data store via the second connection; and
when the data flow mode is determined to be the outflow only mode, refuse to transmit the received inbound data to the data store via the second connection;
in response to receiving outbound data from the data store via the second connection:
when the data flow mode is determined to be one of the outflow only mode or the inflow and outflow mode, transmit the received outbound data to the client device via the first connection; and
when the data flow mode is determined to be the inflow only mode, refuse to transmit the received outbound data to the client device via the first connection.

16. The system of claim 15, further comprising: a firewall configured to selectively allow communication between the gateway and the data store.

17. The system of claim 15, wherein the gateway is further configured to: include a unique identifier assigned to the first connection in the connection request.

18. The system of claim 15, wherein the gateway is further configured to: transmit authentication information corresponding to the client device to the data store via the control channel, in order to enable the data store to authenticate the client device.

19. The system of claim 15, wherein the data store is further configured to:
determine which resources and associated actions are available to the client device; and
publish said resources and associated actions to the client device.

20. The system of claim 15, wherein the gateway is further configured to: assign a unique identifier to the first connection and associate the second connection with the first communication channel on the basis of the unique identifier.

21. The system of claim 15, wherein the inbound data and the outbound data are encrypted.

22. The system of claim 15, wherein the security policy is based on at least one property of the client device.

23. The system of claim 22, wherein the at least one property comprises one of a device profile of the client device, a user profile associated with the client device, or a location of the client device.

24. The system of claim 15, wherein the security policy is based on a property associated with the outbound data.

25. The system of claim 15, wherein the security policy is based on a property associated with the inbound data.

26. The system of claim 15, wherein the security policy is based on metadata associated with the outbound data.

27. The system of claim 15, wherein the security policy is based on metadata associated with the inbound data.

28. The system of claim 15, wherein the gateway is further configured to:
receive authentication information from the client device;
authenticate the client device on the basis of said authentication information; and
establish the first connection.

29. The system of claim 28, wherein the authentication information comprises a secure token.

30. A gateway for facilitating secure communication between a data store and a client device, the gateway comprising:
a processor; and
a memory comprising computer program code,
wherein the processor is configured to process the computer program code and cause the gateway to:
establish a control channel between the gateway and the data store, wherein the establishment of the control channel is initiated by the data store;
receive, at the gateway, from the client device, a first connection initiation request to establish a first connection between the client device and the gateway, the first connection initiation request including a connection request to the data store;
forward the connection request included in the first connection initiation request, from the gateway to the data store, via the control channel in response to receiving the first connection initiation request from the client device;
establish a second connection between the gateway and the data store, wherein the establishment of the second connection is initiated by the data store in response to receiving the connection request from the gateway at the data store, wherein establishing the second connection between the gateway and the data store includes:
receiving authentication information from the data store;
authenticating the data store on the basis of the received authentication information; and
selectively establishing the control channel based on the authentication;
determine data flow mode for the client device based on a security policy associated with the client device, the data flow modes comprising an inflow only mode, an outflow only mode, and an inflow and outflow mode, wherein the inflow only mode permits inbound flow of data to the data store but does not permit outbound flow of data from the data store, wherein the outflow only mode permits outbound flow of data from the data store but does not permit inbound flow of data to the data store, and wherein the inflow and outflow mode permits inbound flow of data to the data store and outbound flow of data from the data store;
in response to receiving inbound data from the client device via the first connection:
when the data flow mode is determined to be one of the inflow only mode or the inflow and outflow mode, transmit the received inbound data to the data store via the second connection; and
when the data flow mode is determined to be the outflow only mode, refuse to transmit the received inbound data to the data store via the second connection;
in response to receiving outbound data from the data store via the second connection:
when the data flow mode is determined to be one of the outflow only mode or the inflow and outflow mode, transmit the received outbound data to the client device via the first connection; and
when the data flow mode is determined to be the inflow only mode, refuse to transmit the received outbound data to the client device via the first connection.

31. The gateway of claim 30, wherein the connection request from the gateway to the data store includes a unique identifier assigned to the first connection.

32. The gateway of claim 30, wherein the processor is further configured to process the computer program code and cause the gateway to: send authentication information corresponding to the client device to the data store via the control channel, wherein the authentication data is configured to be used by the data store in order to authenticate the client device.

33. The gateway of claim 30, wherein the inbound data and the outbound data are encrypted.

34. The gateway of claim 30, wherein the processor is further configured to process the computer program code and cause the gateway to:
receive authentication information from the client device; and
authenticate the client device on the basis of the received authentication information.

35. The gateway of claim 34, wherein the received authentication information comprises a secure token.

36. The gateway of claim 30, wherein the security policy is based on at least one property of the client device.

37. The gateway of claim 30, wherein the at least one property comprises one of a device profile of the client device, a user profile associated with the client device, or a location of the client device.

38. The gateway of claim 30, wherein the security policy is based on a property associated with the outbound data.

39. The gateway of claim 30, wherein the security policy is based on a property associated with the inbound data.

40. The gateway of claim 30, wherein the security policy is based on metadata associated with the outbound data.

41. The gateway of claim 30, wherein the security policy is based on metadata associated with the inbound data.

* * * * *